United States Patent
Cheung et al.

(10) Patent No.: US 7,561,597 B2
(45) Date of Patent: Jul. 14, 2009

(54) SYSTEM AND METHOD FOR DATA PACKET SUBSTITUTION

(75) Inventors: Francis Cheung, Del Mar, CA (US); Ut Nguyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 916 days.

(21) Appl. No.: 10/640,684

(22) Filed: Aug. 14, 2003

(65) Prior Publication Data

US 2005/0036516 A1 Feb. 17, 2005

(51) Int. Cl.
*H04H 20/28* (2008.01)
*H04J 3/12* (2006.01)
*H04N 9/74* (2006.01)

(52) U.S. Cl. .................. 370/487; 370/528; 348/584

(58) Field of Classification Search ............... 370/468, 370/473, 486, 487, 493, 503–506, 523, 528; 348/584, 589, 590, 598
See application file for complete search history.

(56) References Cited

U.S. PATENT DOCUMENTS

| | | | | |
|---|---|---|---|---|
| 5,557,608 | A * | 9/1996 | Calvignac et al. | 370/389 |
| 5,640,388 | A * | 6/1997 | Woodhead et al. | 370/468 |
| 6,064,676 | A * | 5/2000 | Slattery et al. | 370/412 |
| 6,292,490 | B1 * | 9/2001 | Gratacap et al. | 370/412 |
| 6,373,530 | B1 * | 4/2002 | Birks et al. | 348/584 |
| 6,823,131 | B2 * | 11/2004 | Abelard et al. | 386/68 |
| 6,959,151 | B1 * | 10/2005 | Cotter et al. | 398/54 |
| 6,987,767 | B2 * | 1/2006 | Saito | 370/394 |
| 2001/0009547 | A1 * | 7/2001 | Jinzaki et al. | 370/390 |
| 2002/0122430 | A1 * | 9/2002 | Haberman et al. | 370/429 |
| 2004/0090976 | A1 * | 5/2004 | Shung | 370/412 |
| 2006/0062254 | A1 * | 3/2006 | Markevitch et al. | 370/474 |

* cited by examiner

*Primary Examiner*—Hong Cho
(74) *Attorney, Agent, or Firm*—Sterne, Kessler, Goldstein & Fox P.L.L.C.

(57) ABSTRACT

A system and method for substituting data packets into a data stream, is provided. In one embodiment, the data stream is a video data stream. The system includes packet buffers, a multiplexer, a packet substitution controller, a direct memory access (DMA) engine and a link list buffer controller. A method is also provided for substituting data packets—containing information of the same or different type—into a video data stream at variable rates using a selection mechanism driven by link list buffer control.

6 Claims, 4 Drawing Sheets

SYSTEM AND METHOD FOR DATA PACKET SUBSTITUTION

BACKGROUND OF THE INVENTION

1. Field of the Invention

The present invention relates to data processing, and more particularly, to data packet substitution.

2. Background of Invention

Television systems have become increasingly complex as consumers continue to demand greater functionality and performance from television sets. Furthermore, the geographic diversity and business interests of manufacturers and service providers within the television and recording industries has lead to a plethora of analog and digital video formats. For example, analog video signal formats include National TV System Committee (NTSC), Phase Alternation Line Rate (PAL), and Sequential Couleur Avec Memoire (SECAM) television signals. Example digital video signal formats include ITU-R-656 and Digital Video Interface (DVI).

When program channels are transmitted to customer premise devices, such as a television or cable set top box, data packets for program channels are typically multiplexed together into a video data stream. So, for example, program channels, such as CNN, HBO, and ESPN can be combined into a single data stream. When the video data stream is received by a customer premise device, the customer premise device often parses the incoming stream to retain only those packets that pertain to the channel of interest to be viewed or recorded.

The parsing process can create gaps in the data stream where packets associated with channels other than the channel of interest were located. The parsing of the stream potentially leaves time gaps where packets were removed. A number of approaches can be used to address the existence of gaps. A buffer can be used to compress the remaining packets and remove the gaps or null data packets can be inserted into the gaps. Additionally, packets containing system or other information can be substituted into the gaps.

As the complexity of data processing systems increases, the need for a robust and flexible approach to substitute packets into a data stream, such as a video data stream, increases without impairing performance. In particular, system and management information associated with a data stream is likely to change as a result of adjustment in encryption or organization of packets within a data stream, for example. Moreover, different types of information may need to be inserted into a data stream, and the different types of information may have different timing requirements. Different types of information can include, for example, system information for video control, system information for audio control, overall system management information, or customer specific application information.

What is needed is a system and method for efficiently substituting data packets into a data stream.

SUMMARY OF THE INVENTION

The present invention is directed to a system and method for substituting data packets into a data stream. In one embodiment the data stream is a video data stream. The system includes packet buffers, a multiplexer, a packet substitution controller, a direct memory access (DMA) engine and a link list buffer controller. A method is provided for substituting data packets—containing information of the same or different type—into a data stream, such as a video data stream, at variable rates using a selection mechanism driven by link list buffer control.

The invention provides an efficient and robust means to substitute packets into a data stream. In particular, the invention enables more than one type of information to be contained with packets that are to be inserted into a data stream. Additionally, the invention supports substitution of packets into a data stream at multiple rates through a sophisticated rate control mechanism that can vary based on the type of information within a packet.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
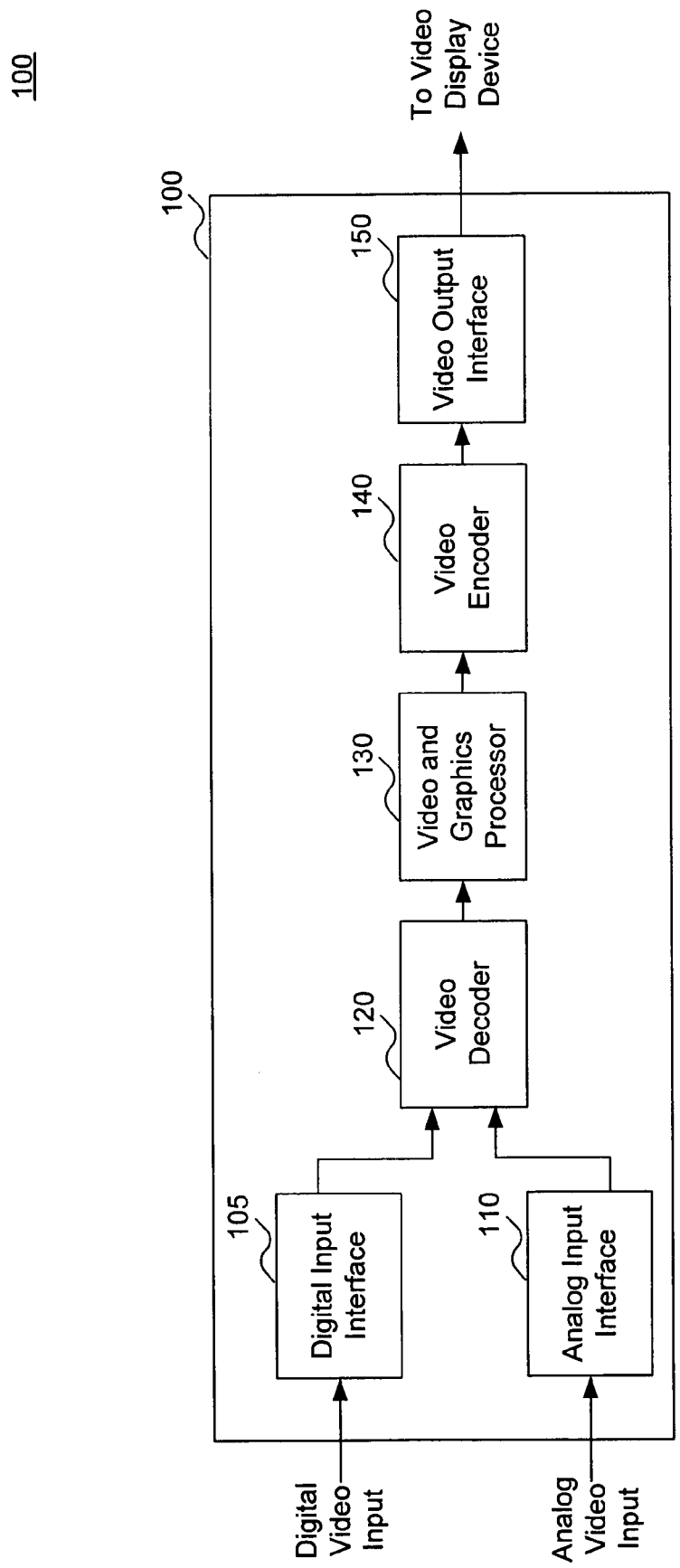
FIG. 1 is a diagram of a video processing system, according to an embodiment of the invention.

FIG. 1 provides a diagram of an example video processing system 100, according to an embodiment of the invention. A video processing system, such as video processing system 100, receives video input streams and manipulates the stream to properly format an output video stream. Video processing system 100 can also integrate graphics and text (e.g., teletext) into the video stream and output a reformatted video stream. A video processing system, such as video processing system 100, will typically be located within a video processing device, such as a television or cable set-top box.

Video processing system 100 includes digital input interface 105, analog input interface 110, video decoder 120, video and graphics processor 130, video encoder 140 and video output interface 150. Digital input interface 105 can receive one or more digital video input streams. Analog input interface 110 can receive one or more analog video input streams. Video decoder 120 can support decoding and encoding of both analog and video input signals, and is coupled to the outputs of digital input interface 105 and analog input interface 110. Video decoder 120 can support high quality decoding of a standard definition analog composite video broadcasting signal (CVBS) and S-Video signals, for example. Similarly video decoder 120 can decode digital video signals that comply with the International Telecommunications Union (ITU) standard ITU-R-656 at varying resolutions including 525i, 625i, and 240p.

Video and graphics processor 130 includes a variety of functions for processing video and graphics, including integrating video and graphics, and is coupled to the output of video decoder 120. In particular, video and graphics processor 130 can include MPEG graphics and video feeders, video scalers, capture blocks, and video compositors for combining video and graphics.

Video encoder 140 can support both standard and high definition video signals, and is coupled to the output of video and graphics processor 130. For example, video encoder 140 can support a variety of analog video standards (e.g., NTSC, PAL, SECAM, 480i, 480p, 720p, and 1080i), as well as digital video standards (e.g., ITU-R-656 and support for digital video interface (DVI) encoding).

Video output interface 150 can consist of a set of analog and digital output interfaces to support a multitude of video standards, and is coupled to the output of video encoder 140. Video output interface 150 can be coupled to a video processing device, such as a television, a monitor, or a cable set top box to display a video signal or for further processing.

Figure 2:
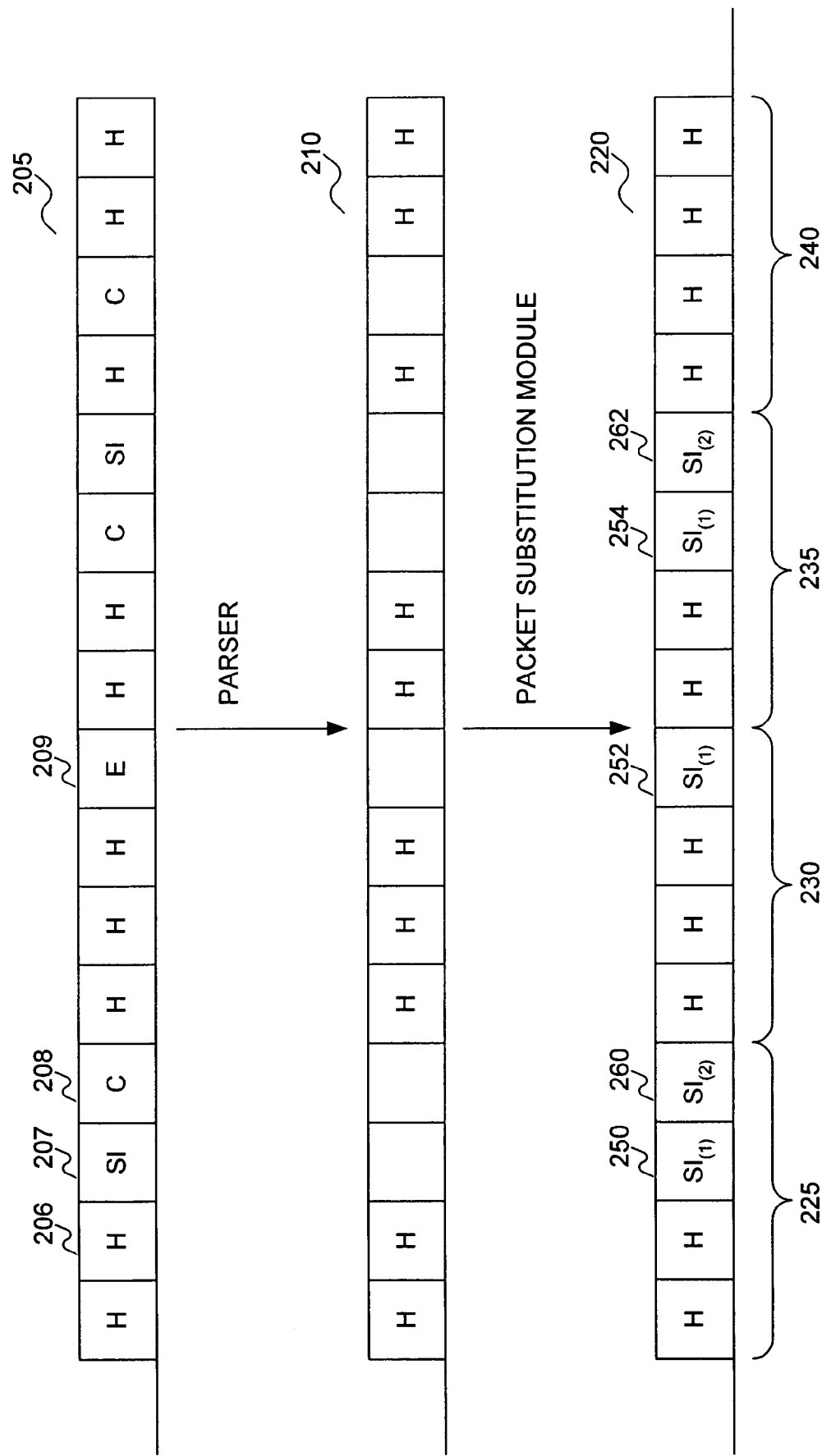
FIG. 2 is a diagram of a time progression of a video data stream being processed, according to an embodiment of the invention.

The focus of the present invention primarily relates to functions that can occur within digital input interface 105. Digital input interface will typically receive one or more video data input streams. In the case of video data input streams that are distributed to a cable set-top box, a video data input stream can contain multiple program channels. FIG. 2 is a diagram that shows a video data input stream, according to an embodiment of the invention. FIG. 2 shows how processing impacts the contents of a video data input stream.

Specifically, FIG. 2 shows a time progression of a video data input stream at three points. Video data input stream 205 represents a simplified video data input stream that can be received by a cable set-top box, for example. Video data input stream 210 shows video data input stream 205 after video data input stream 205 has been parsed. Video input stream 220 shows video input stream 210 after being processed by the present invention, according to one embodiment of the invention.

Video data input stream 205 contains sixteen packets of programming information, represented by rectangles containing letters indicating the channel or system information contained within a packet. For example, packet 206 contains data for an HBO channel (represented by an H in FIG. 2), packet 207 contains data for system information (represented by SI), packet 208 represents information for CNN (represented by C), and packet 209 represents information for ESPN (represented by E). The information within these packets will ultimately be processed by video processing system 100 to produce a video signal suitable to display the program on a television or other monitor. The system information contained within packet 207 can include information about how the packets are organized, what type of encryption may be used, timing information and other information that supports interpretation and manipulation of the data contents in video data input stream 205.

Video data input stream 210 shows video data input stream 205 after video data input stream 205 has been parsed. In a video processing system, such as video processing system 100, program information for one channel needs to be extracted from a video data input stream, such as video data input stream 205, so the program can either be displayed, recorded or forwarded to another device. Typically, a parser located within digital input interface 105 extracts those packets associated with a program channel of interest based on program identification (PID) information within each packet.

The parsing of the stream potentially leaves time gaps between packets of interest—in this case HBO packets—where other packets were removed. A number of approaches can be used to address the existence of gaps between the extracted packets. A buffer can be used to compress the remaining packets and remove the gaps or null data packets can be inserted into the gaps. Additionally, packets containing system or other information can be substituted into the gaps (or in other words substituted for the original packets that existed in the gaps.)

The invention provides a system and method for substituting packets for the original packets that existed in the gaps. Video data input stream 220 shows video data input stream 210 after that stream has been processed by the invention. In this case, video data input stream 220 has been divided into four substitution time intervals—substitution time interval 225, 230, 235 and 240—that each contain four packets. A substitution time interval represents the time period in which one packet of a particular type should be inserted. A typical duration for a substitution time interval can be around 100 ms, but is not limited to this amount of time. Packets within time substitution time interval 225 arrive first in time. Packets in substitution time interval 230 arrive second in time. Packets in substitution time interval 235 arrive third in time. Packets in substitution time interval 240 arrive fourth in time.

In this example, a packet substitution module, such as is described in detail with respect to FIG. 3 below, substitutes two types of packets: SI(1) and SI(2). SI(1) refers to system information that contain system or other types of content information. SI(2) also refers to system information that contains system or other types of content information. The difference between SI(1) and SI(2) is the type of information and that the substitution rate can differ.

For example, in the present case an attempt to insert SI(1) type information occurs in every substitution time interval, whereas an attempt to insert SI(2) type information occurs every other substitution time interval. FIG. 2 depicts this approach. Packets 250, 252, and 254 all contain SI(1) type information, and are inserted in substitution time interval 225, 230 and 235 respectively. Similarly, packets 260 and 262 are inserted in substitution time intervals 225 and 235. There is no attempt to insert an SI(2) packet in substitution time interval 230. Finally, because all slots within time substitution interval 240 contain HBO packets, no SI(1) packet will be substituted in this case. In this case, the packet of SI(1) information that was to be substituted in substitution time interval 240 will be placed into the first subsequent substitution time interval that has a slot that is not already filled with a packet of information that is to be retained.

Figure 3:
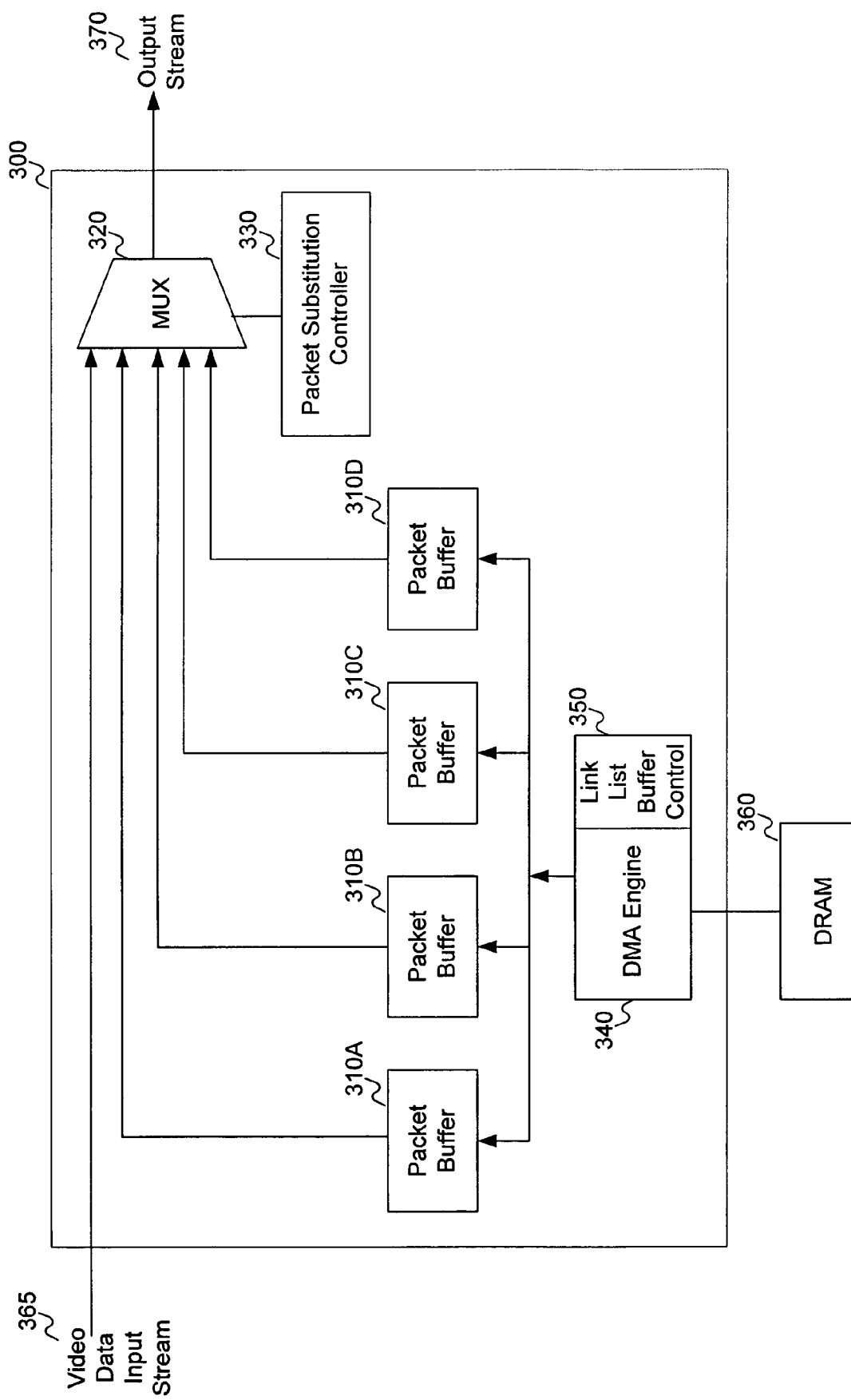
FIG. 3 is a diagram of a packet substitution module, according to an embodiment of the present invention.

FIG. 3 is a diagram of packet substitution module 300, according to an embodiment of the invention. Packet substitution module 300 includes packet buffers 310A, 310B, 310C, 310D; multiplexer 320, packet substitution controller 330, direct memory access (DMA) engine 340 and link list buffer control 350.

Packet buffers 310A through 310C are coupled to multiplexer 320 and to DMA engine 340. Packet buffers 310A through 310C store packets of information, such as SI(1) or SI(2) to be substituted into a video data input stream.

Multiplexer 320 has five data inputs and one control input. The five data inputs include coupling to each of packet buffers 310A through 310C, and coupling to video data input stream 365. Referring back to FIG. 2, video data input stream 365 is represented by video data input stream 210. That is, video data input stream 365 is a video input stream that has been parsed, such that the packets for the program of interest have been retained, but gaps between those packets exist. Multiplexer 320 receives a control input from packet substitution controller 330. Based on instructions from packet substitution controller 330, multiplexer 320 substitutes packets obtained from packet buffers 310A through 310D into video data input stream 365. Multiplexer outputs output stream 370. Referring to FIG. 2, video data input stream 220 is representative of the characteristics of output stream 370.

Packet substitution controller 330 is coupled to multiplexer 320. Packet substitution controller 330 informs multiplexer 320 the rate of substitution, and what packet buffer to use to substitute a packet into video data input stream 365. In one embodiment, packet substitution controller can maintain multiple substitution time intervals, such that packets carry different types of information can be substituted in video data input stream 365 at different rates. In another embodiment, packet substitution controller can contain a priority control mechanism, such that a substitution packet will be substitute for an existing data packet, provided that the substitution packet has a higher priority than the existing data packet.

DMA engine 340 is coupled to link list buffer control 350 and to dynamic random access memory (DRAM) 360 that resides external to packet substitution module 300. DMA engine 340 places packets into packet buffers 310A through 310D. Link list buffer control 350 provides an efficient mechanism for determining what information should be placed into packet buffers 310A through 310D.

Figure 4:
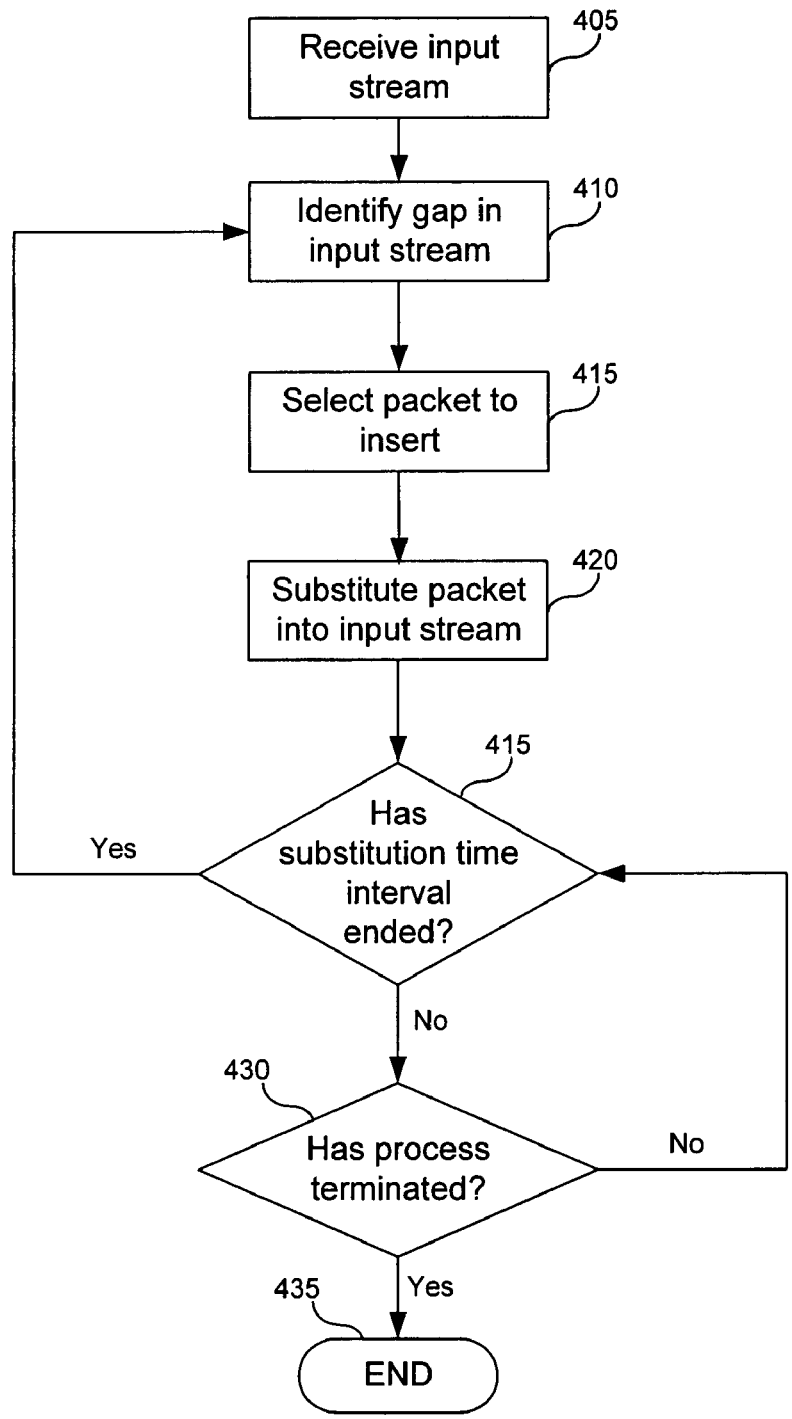
FIG. 4 is a flow chart of a method for substituting packets into a data stream, according to an embodiment of the invention.

FIG. 4 is a diagram of a flowchart of method 400 for substituting packets into a data stream, according to an embodiment of the invention. Method 400 begins in step 405. In step 405, a video data input stream is received. For example, packet substitution module 300 can receive video data input stream 365.

In step 410, a gap in the received video data input stream is identified. For example, multiplexer 320 can determine that a null packet exists within video data input stream 365. In one embodiment if no gap exists within a substitution time interval, the packet to be inserted will be retained in a packet buffer, such as packet buffer 310. An attempt will be made to substitute this packet in a subsequent substitution time interval. In another embodiment, a gap need not exist. In this alternative embodiment, a priority control mechanism can exist in which a substitute packet will be substituted even when another packet of accepted data (e.g., a parser has passed along data associated with a channel of interest) already fills the selected slot. The priority control mechanism can exist in a packet substitution controller, such as packet substitution controller 330, in which various priority schemes can be developed. For example, certain types of system information can have greater importance than a data packet carrying information about a program channel of interest.

In step 415, a packet to insert is selected. The selection of a packet can entail several intermediate steps. In one embodiment, link list buffer control 350 can identify packets that a host system would like to insert into a video data input stream. Link list buffer control 350 can instruct DMA engine 340 to place these packets or packet into one or more packet buffers, such as packet buffers 310. Once a packet is loaded into a packet buffer, a command from a host system or other controller can be provided to packet substitution controller 330 instructing it to attempt to input the packet into the video data input stream. Packet substitution controller 330 can instruct multiplexer 320 to select the packet. Multiplexer 320 would then select a packet to insert.

In step 420, a packet is substituted into a video data input stream. For example, multiplexer 320 can substitute a packet into video data input stream 365. In one embodiment, time stamps associated with null packets in gaps or for data packets that are being replaced by a substituted packet are preserved. In this situation, when an input stream is received a time stamp is generated for each packet. Multiplexer 320 preserves this time stamp when substituting a packet. In this way, a local timestamp corresponding to the packet location that the new packet occupies in the stream will be correct.

In step 425, a determination is made whether a substitution time interval has ended. If a substitution time interval has ended, this indicates that an attempt should be made to insert another packet into a video data input stream. In this case, method 400 returns to step 410. In one embodiment, packets having different types of information can be substituted. In this case, multiple substitution time intervals would be monitored to determine when to substitute a packet for each of the different types of information.

If a substitution time interval has not ended, method 400 proceeds to step 430. In step 430 a determination is made whether to terminate method 400. For example, a system shutdown command can be received. If a determination is made to terminate method 400, method 400 proceeds to step 435 and ends. If a determination is made not to terminate method 400, method 400 loops back to set 425 and waits until the substitution time interval ends.

The present method has been described with reference to a video data stream. Upon review of the teachings herein, individuals skilled in the relevant arts will recognize how to extend the present method to other types of data streams. Such alternatives fall within the scope and spirit of the invention.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A packet substitution module for substituting packets into a parsed data stream, comprising:
   a plurality of packet buffers that buffer packets to be substituted into the parsed data stream;
   a multiplexer that obtains packets from said plurality of packet buffers and substitutes packets into the parsed data stream;
   a packet substitution controller that controls the operation of said multiplexer;
   a direct memory access (DMA) engine that provides packets to said plurality of packet buffers; and
   a link list buffer control coupled to said DMA engine to control said DMA engine and determine which packets to provide to said plurality of packet buffers.

2. The packet substitution module of claim 1, wherein said packet substitution controller controls said multiplexer to substitute packets at different rates.

3. The packet substitution module of claim 2, wherein said packet substitution controller controls said multiplexer to substitute packets at different rates based on the type of information contained within a packet.

4. The packet substitution module of claim 2, wherein said packet substitution controller controls said multiplexer to substitute a substitution packet for an existing packet in the parsed data stream when a priority for the substitution packet is higher than a priority for the existing packet.

5. The packet substitution module of claim 1, wherein said multiplexer delays substituting a packet in a first substitution time interval until a subsequent time interval, when all slots within the first substitution interval contain packets to be retained.

6. The packet substitution module of claim 1, wherein the parsed data stream is a video data stream.

* * * * *